May 19, 1953 G. R. RATCLIFF 2,638,710
ESCAPEMENT-CONTROLLED MOVABLE DOLL EYE
Filed July 12, 1949 3 Sheets-Sheet 1
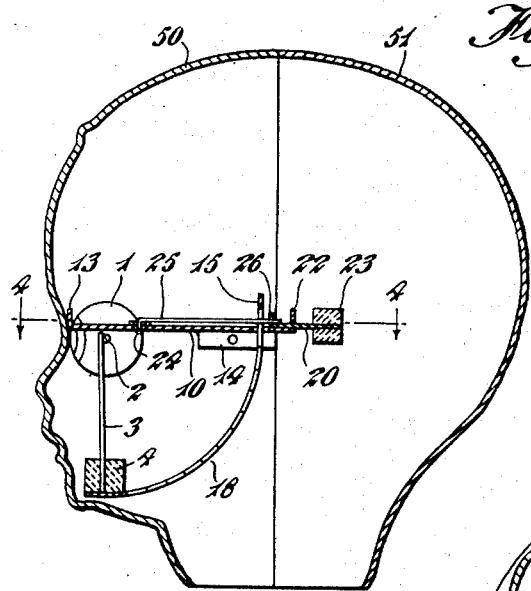
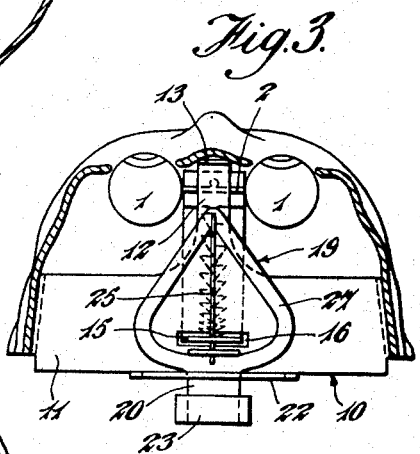
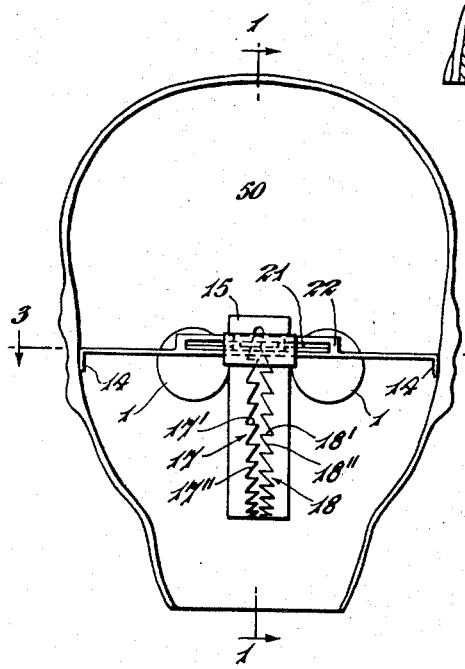
INVENTOR
George R. Ratcliff
By Watson, Cole, Grindle & Watson

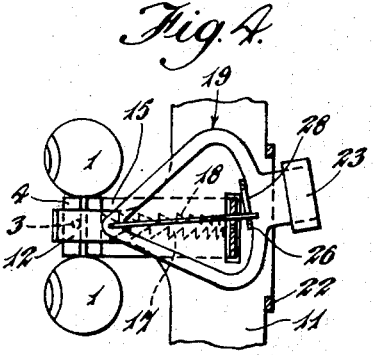
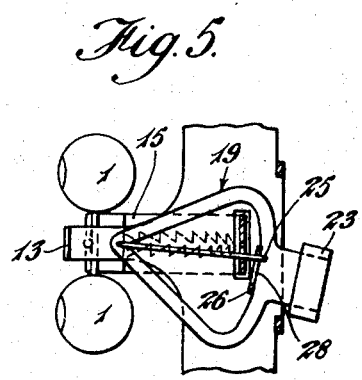
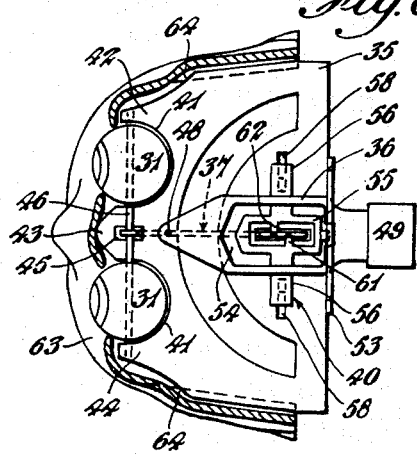
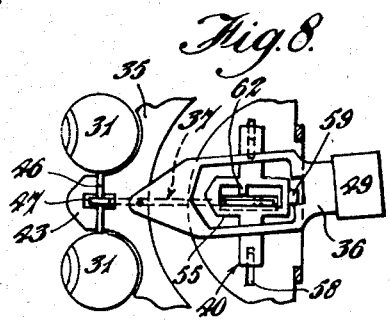
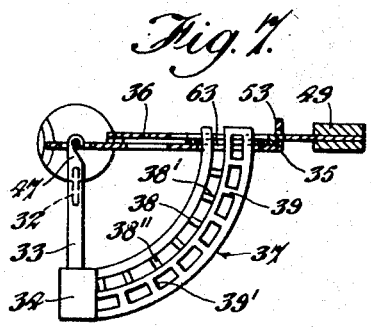
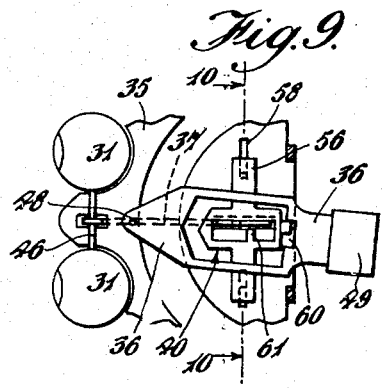

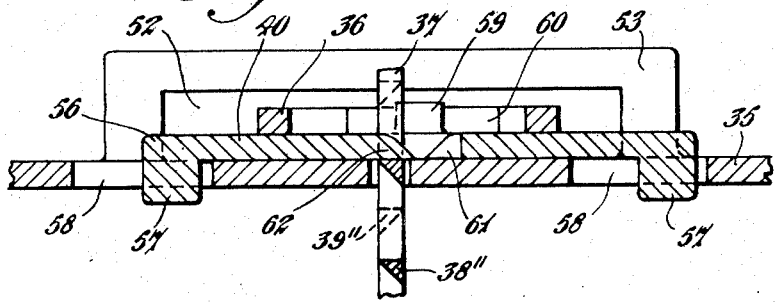
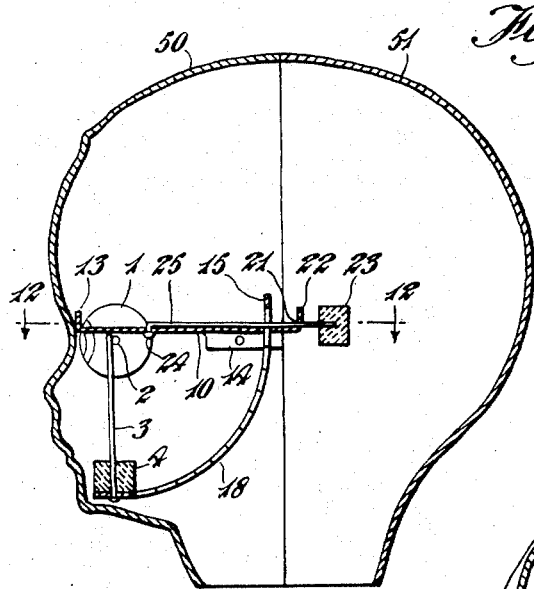
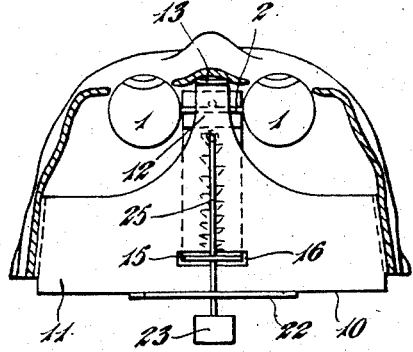

Patented May 19, 1953

2,638,710

UNITED STATES PATENT OFFICE 2,638,710

ESCAPEMENT-CONTROLLED MOVABLE DOLL EYE

George Richard Ratcliff, London, England

Application July 12, 1949, Serial No. 104,187
In Great Britain July 20, 1948

11 Claims. (Cl. 46—169)

This invention relates to dolls, toy animals and like model figures having a hollow head containing an eye assembly of the kind comprising eye elements, a mount therefor, and a gravity arm which, on appropriate movements being given to the head, causes the eye assembly to rotate so that the eye elements have the appearance of opening and closing. Such movable eye elements are known as sleeping eyes.

In the known dolls and like model figures having sleeping eyes, the eyes move to the closed or sleeping position directly the appropriate movement is given to the head and the object of my invention is to provide a sleeping eye assembly wherein the eye elements do not move to the closed or sleeping position directly the appropriate movement is given to the head but only move to such position gradually and by repeated movement of the head.

According to my invention I combine an eye assembly of the kind above specified with means permitting the eye assembly to move from the open position of the eye elements thereof to the closed position of such elements only on giving the eye unit so formed as side to side rocking movement but allowing the eye assembly to move quickly and unimpededly from the closed position of the eye element to the open position thereof when the eye assembly is moved to a position in which the gravity arm is substantially horizontal. The said means preferably comprise an arcuate member secured at one end to the gravity arm of the eye assembly to move with such arm and having two sets of ratchet teeth, the teeth of one set being offset with respect to the teeth of the other set, a support, a latching member oscillatably mounted on said support and co-operating with said sets of ratchet teeth, and means for oscillating said latching member when the eye unit is rocked.

My invention will be further described with reference to the accompanying drawings, in which Figure 1 is a vertical sectional view, as along line 1—1 of Figure 2, of the head of a doll having mounted therein one form of eye unit in accordance with my invention;

Figure 2 is an end elevational view of the face half of the head shown in Figure 1 with the eye unit mounted therein;

Figure 3 is a horizontal sectional view taken on line 3—3 of Figure 2;

Figure 4 is a sectional view of the eye unit, as along line 4—4 of Figure 1, illustrating the position of the parts after the unit has been given a rocking movement to one side;

Figure 5 is a similar view to that of Figure 4 illustrating the position of the parts after the eye unit has been given a rocking movement to the other side;

Figure 6 is a top plan view of an alternative form of eye unit shown mounted in the face half of the head of a doll, shown partly in section;

Figure 7 is a side elevational view, partly in section, of the eye unit shown in Figure 6;

Figure 8 is a partial plan view of the eye unit shown in Figures 6 and 7, illustrating the position of the parts when the unit has been given a rocking movement to one side;

Figure 9 is a similar view to that of Figure 8, illustrating the position of the parts when the eye unit has been given a sideways rocking movement in the reverse direction;

Figure 10 is a section taken on line 10—10 of Figure 9, drawn upon an enlarged scale;

Figure 11 is a view similar to that of Figure 1, illustrating a further form of eye unit, and Figure 12 is a sectional view taken on line 12—12 of Figure 11.

Referring first to Figures 1 to 5, the eye unit shown therein comprises spherical or other suitably-shaped eye elements 1 which are made of any suitable material and which are provided with eyelids and otherwise formed to simulate human eyes. The eye elements 1 are rigidly mounted on a rod 2 having depending centrally therefrom a gravity arm 3 to the lower end of which a weight 4 is secured. The eye elements 1, rod 2 and gravity arm 3 from an eye assembly which is rotatable as a unit, the assembly being rotatably mounted in the face half 50 of the two-piece head 51 by cementing the eye elements in the eye sockets of the face half 50 of the head, the eye assembly being rotated whilst the cement is setting so that, when the cement (not shown in the drawings) has set, the eye elements are freely rotatable. Also cemented to the interior of the face half 50 of the head is a support 10 for the latching member, said support comprising a transverse bridge portion 11 and a nose portion 12, the support being secured within the face half of the head by cement (not shown) applied to a lug 13 upstanding from the nose portion 12 and flanges 14 depending from the ends of the bridge portion 11, the said lug and the flanges being apertured to receive the cement and provide a key therefor.

Secured at one end to the lower end of gravity arm 3 is a quadrant 15, the quadrant extending through a slot 16 in the support 10. The quadrant comprises a strip of metal or other suitable material bent in the direction at right angles to the plane of the strip. A slot extends longitudinally of the strip and the slides of the slot are formed to provide two sets of ratchet teeth 17, 18, the teeth of one set being offset or staggered with respect to the teeth of the other set in the direction of arcuate extent of the quadrant, the apices of the teeth of one set being located about midway of the inclined sides of the teeth of the other set. The inclined sides 17'', 18'' of the teeth 17, 18 incline inwardly towards the free end of the arcuate strip, and the other sides of the teeth from abrupt shoulders 17',18'.

Pivotally mounted on the nose portion 12 of support 10 is a pendulum 19 comprising a triangular-shaped portion 27 and a stem portion 20 which extends rearwardly from the base of the triangular portion through a rectangular aperture 21 in a flange 22 upstanding from the bridge portion 11 of support 10 and which carries a weight 23, the pendulum being pivoted to the support by the turned-down end 24 of a wire 25 which forms the oscillatable latching member and which extends rearwardly through the slot in quadrant 15 and through a rectangular slot 28 (Figures 4 and 5) in flange 26 upstanding from the base of the triangular-shaped portion 27 of the pendulum 19.

When the head of the doll is moved from the upright position shown in Figures 1 to 3 in which the gravity arm 3 is vertical to a horizontal, sleeping position in which the gravity arm is horizontal, the eye elements are prevented from moving to the closed position thereof under the action of the gravity arm by engagement of the latching wire 25 with an abrupt shoulder 17' or 18' of a ratchet tooth 17 or 18 at the free end of quadrant 15. The eye elements, however, may be caused to move gradually to the closed position thereof by rocking the head of the doll and thereby the eye unit from side to side. When the eye unit is rocked to one side, the pendulum 19 will move to one side, as shown in Figure 4, the latching wire traversing the slot 28 in flange 26 until the wire engages the adjacent end wall of the slot. On further movement of the pendulum it carries with it the latching wire, bringing it out of engagement with the abrupt shoulder and into engagement with the inclined side of the opposed tooth. The quadrant 15 will then move relatively to the latching wire until the wire engages the abrupt shoulder formed by the next tooth. The latching wire is disengaged from this shoulder in a similar manner by giving the eye unit a sideways or rocking movement in the reverse direction so that the pendulum moves to the other side, as shown in Figure 5, and it will be understood that by repeatedly rocking the eye unit from side to side the gravity arm will gradually move to a substantially vertical position in which it engages the support 10 and the eye elements 1 are in fully closed position. When the eye unit is again moved to an upright position, the gravity arm will move freely to a vertical position in which the eye elements are open, the ratchet teeth 17, 18 of quadrant 15 passing freely over the latching wire 25. During this movement of the quadrant, the latching wire oscillates slightly from side to side. The amplitude of oscillation is, however, less than the width of the slot 28 in flange 26 with the result that the pendulum 19 is not caused to oscillate.

In the modified form of eye unit shown in Figures 6 to 10, the eye assembly is rotatably mounted on the support for the latching member and the toothed quadrant is curved in the plane of the strip. This eye unit is slidably mounted in the face half of the head of the doll and consists of an eye assembly comprising eye elements 31 movable by a bridge member 32 having an integral arm 33 depending therefrom and carrying a weight 34 at its free end, a supporting member 35 to which the eye assembly is pivoted, a pendulum 36 pivoted to the supporting member, an arcuate member 37 that is secured to the free end of the gravity arm 33 and that has two sets of ratchet teeth 38, 39, and an oscillatable latching member 40 that co-operates with the pendulum and with the arcuate member to control movement of the gravity arm.

The supporting member 35 consists of a flat plate made of plastics, metallic or any other suitable material and having in the front side thereof two spaced, eye element-receiving recesses 41 that provide the supporting member with three forwardly-extending prongs 42, 43, 44. The central prong 43 projects forwardly more than the side prongs 42, 44 which on the lower face thereof have transverse grooves aligned with a transverse groove in the upper face of the central prong 43 which has a slot 45 therein overlapping the groove. The eye elements 31 have a hole extending diametrically therethrough and are secured within the recesses in the supporting member by a wire pivot pin 46 which is threaded through the holes in the eye elements and which is secured to the supporting member 35 by placing the central portion of the pivot pin in the groove in the upper face of the central prong 43 and springing the end portions of the pivot pin to lie in the grooves in the lower face of the side prongs 42, 44. The eye elements 31 are secured to the bridge member 32 which is formed of plastics or other suitable material and which extends into slots formed in the eye elements, the bridge member being secured to the eye elements by means of an integral hook member 47 which extends upwardly through the slot 45 in the central prong of the supporting member and engages over the pivot pin 46.

The quadrant 37 which may conveniently be formed of a moulded plastic material has two series of arcuately-disposed slots therein forming two series of ratchet teeth 38, 39 offset one with respect to the other, the ends of the teeth remote from weight 34 forming square shoulders 38', 39', the other ends of the teeth being bevelled to form two series of oppositely-included faces 38'', 39''.

The pendulum 36 is pivoted to the supporting member 35 at 48 and carries at its free end a weight 49, the pendulum oscillating in a rectangular slot 52 in flange 53 upstanding from support 35.

The latching member 40 is oscillatably mounted on the support 35 and comprises a substantially rectangular central portion 55 received in a correspondingly shaped opening 54 in the pendulum 36, two opposed transverse arms 56 having lugs 57 depending from their free ends and received in elongated slots 58 in support 35, and a rearwardly-extending finger 59 received in recess 60 in pendulum 36. The central portion 55 of the oscillatable latching member 40 has a rectangular opening therein into which project two offset detent elements 61, 62 having bevelled upper faces. The quadrant 37 extends through a slot 63 in support 35 and through the opening in the central portion 55 of the latching member with the detent elements 61, 62 co-operating with the ratchet teeth 39, 38 respectively to control movement of the gravity arm 33.

The eye unit above described may be secured within the face half 63 of the head of a doll by sliding the edge portions of the support 35 in slots 64 formed in the said face half, the unit being held in position in the face half of the doll's head with the central prong 43, which serves as a depth stop, engaging the front of the face half by stops on the rear half (not shown) of the head, which stops, when the two halves of the head are secured together, engage the rear side of the support 35.

When the head of the doll is moved from an upright position (as shown in Figures 6 and 7) in which the gravity arm 33 is vertical to a horizontal position in which the gravity arm is horizontal, the gravity arm will be prevented from moving downwardly to bring the eye elements to their closed position by engagement of one of the detents 62, 61 with a square shoulder 38', 39' of the ratchet teeth 38, 39 respectively at the free end of quadrant 37. Assuming that the detent 62 engages a square shoulder 38', the detent can be brought out of engagement with such shoulder by giving the unit a sideways rocking movement, whereby the pendulum is swung over to the position shown in Figure 9. During this movement of the pendulum, it swings freely until the finger 59 is engaged by the adjacent end wall of recess 60, further movement of the pendulum then moving the latching member 40 to bring the detent 62 out of engagement with the square shoulder 38'. The quadrant then moves under the action of and with the gravity arm 33 until the detent 61 engages the adjacent square shoulder 39'. Detent 61, however, may be disengaged from this shoulder by giving the eye unit a sideways rocking movement in the reverse direction whereby the pendulum 36 is moved to the position shown in Figure 10, the pendulum during this movement first moving freely until the finger 59 is engaged by the adjacent end wall of recess 60 and then moving the latching member 40 to disengage the detent 61 from the square shoulder 39' and to allow the quadrant 37 to move until the detent 62 engages the next square shoulder of tooth 38. Thus by rocking the eye unit from side to side the quadrant is allowed to move step by step under the action of the gravity arm until the eye elements are in their fully closed position, the gravity arm then being in a substantially vertical position. When the eye unit is uprighted to bring the gravity arm to a substantially horizontal position, the gravity arm moves freely to a vertical position so that the eye elements are quickly brought to the eye open position thereof, the bevelled faces of the detents 62, 61 ratcheting over the oblique faces 38'', 39'' of the ratchet teeth 38, 39 and, due to the sideways camming action of the oblique faces, giving the latching member 40 a slight oscillatory movement so that the detents 62, 61 may pass the teeth 38, 39. The amplitude of oscillation of the latching member 40 and thus of finger 59 is such that the finger 59 can oscillate freely in recess 60 without imparting movement to pendulum 36.

In the eye units above described, the latching members 25 and 40 may be light in weight, the necessary oscillatory movement being imparted thereto by a separate pendulum member. The latching members could, however, be so constructed that a rocking movement given to the eye unit will impart the necessary oscillatory movement to the latching member, for example, as shown in Figures 11 and 12, wire 25 may extend through slot 21 in flange 22 and carry a weight 23 at its free end. In this case, the arcuate member 15 can be secured loosely to the gravity arm 3 so that the arcuate member can oscillate transversely relatively to the gravity arm to a limited extent and will permit the arcuate member to move to the eye-open position of the gravity arm without oscillating the latching member, the arcuate member instead undergoing the necessary oscillatory movement to allow the teeth on the arcuate member to pass the latching member.

My invention includes not only a doll or other model figure having my improved eye unit mounted therein but also the improved eye unit per se.

I claim:

1. An eye assembly including operating means therefor, for dolls, toy animals, and other model figures; said assembly comprising eye elements, a mount supporting said eye elements, a gravity arm, means operatively connecting said gravity arm with said eye elements for rotating the latter upon movement of the entire assembly as a whole, an arcuate member secured at one end to the gravity arm to move therewith and having two sets of ratchet teeth, the teeth of one set being offset with respect to the teeth of the other set, a support, and a latching member oscillatably mounted on said support, and means for loosely mounting said latching member for movement alternately into the paths of the abrupt faces of the ratchet teeth of said respective sets, gravity controlled means associated with said latching member and adapted to so move the latter only upon side to side rocking movement of the said assembly thereby to permit the arcuate member to move step-by-step in one direction relatively to the said latching member under the action of gravity, said loose mounting of the latching member enabling free displacement of the latching member from side to side by contact with the inclined faces of the ratchet teeth upon movement of the arcuate member in the opposite direction thereby permitting the teeth to ratchet freely past the latching member so that the arcuate member moves freely in the opposite direction relatively to the said latching member under the action of the gravity arm.

2. An eye assembly as set forth in claim 1, wherein the said arcuate member comprises a strip bent to arcuate form in the direction at right angles to the plane thereof and having a slot whose sides provide the ratchet teeth, and the latching member comprises a wire pivoted to the said support and extending through the said slot in the arcuate member.

3. An eye assembly as set forth in claim 1, wherein the said arcuate member comprises a strip curved edgewise along a line lying in the plane thereof and slotted to provide the two sets of ratchet teeth and the latching member comprises detents which cooperate with the said sets of ratchet teeth.

4. An eye assembly as set forth in claim 1, including a pendulum oscillatably mounted on the said support so as to oscillate when the combination is given a side to side rocking movement and operative connections between said pendulum and said latching member to impart its oscillatory movement to said latching member.

5. An eye assembly as set forth in claim 4, wherein the latching member is so mounted as to afford it a limited freedom of oscillatory movement relatively to the pendulum.

6. An eye assembly including operating means therefor, for dolls, toy animals, and other model figures; said assembly comprising eye elements, a mount supporting said eye elements, a gravity arm, means operatively connecting said gravity arm with said eye elements for rotating the latter upon movement of the entire assembly as a whole, an arcuate strip curved in the direction at right angles to the plane thereof and secured at one end to the gravity arm, two sets of ratchet teeth on said strip, the teeth of one set being offset relatively to the teeth of the other set, a support, a latching member, means oscillatably mounting said latching member on said support, and means for loosely mounting said latching member for movement alternately into the paths of the abrupt faces of the ratchet teeth of said respective sets, gravity controlled means associated with said latching member and adapted to so move the latter only upon side to side rocking movement of the said assembly thereby to permit the arcuate member to move step-by-step in one direction relatively to the said latching member under the action of gravity, said loose mounting of the latching member enabling free displacement of the latching member from side to side by contact with the inclined faces of the ratchet teeth upon movement of the arcuate member in the opposite direction thereby permitting the teeth to ratchet freely past the latching member so that the arcuate member moves freely in the opposite direction relatively to the said latching member under the action of the gravity arm, and a pendulum mounted on said support to oscillate when the combination is given a side to side rocking movement and operative connections between said pendulum and said latching member to impart its oscillatory movement thereto.

7. An eye assembly including operating means therefor, for dolls, toy animals, and other model figures; said assembly comprising eye elements, a mount supporting said eye elements, a gravity arm, means operatively connecting said gravity arm with said eye elements for rotating the latter upon movement of the entire assembly as a whole, an arcuate strip curved edgewise along a line lying in the plane thereof and slotted to provide two sets of ratchet teeth, the teeth of one set being offset relatively to the teeth of the other set, a support, a latching member, means oscillatably mounting said latching member on said support, and means for loosely mounting said latching member for movement alternately into the paths of the abrupt faces of the ratchet teeth of said respective sets, gravity controlled means associated with said latching member and adapted to so move the latter only upon side to side rocking movement of the said assembly thereby to permit the arcuate member to move step-by-step in one direction relatively to the said latching member under the action of gravity, said loose mounting of the latching member enabling free displacement of the latching member from side to side by contact with the inclined faces of the ratchet teeth upon movement of the arcuate member in the opposite direction thereby permitting the teeth to ratchet freely past the latching member so that the arcuate member moves freely in the opposite direction relatively to the said latching member under the action of the gravity arm, and a pendulum mounted on said support to oscillate when the combination is given a side to side rocking movement and operative connections between said pendulum and said latching member to impart its oscillatory movement thereto.

8. An eye assembly including operating means therefor, for dolls, toy animals, and other model figures; said assembly comprising eye elements, a mount supporting said eye elements, a gravity arm, means operatively connecting said gravity arm with said eye elements for rotating the latter upon movement of the entire assembly as a whole, an arcuate member secured at one end of the gravity arm to move therewith, two sets of ratchet teeth on said arcuate member, the teeth of one set being offset relatively to the teeth of the other set, a support, a pendulum member, means oscillatably mounting said pendulum member on said support, a latching member adapted to alternately contact teeth of said respective sets, means operatively connecting said latching member with said pendulum for shifting the former into and out of engagement with said respective sets of teeth thus permitting the arcuate member to move step by step in one direction relative to the latching member under the action of gravity, means loosely mounting said latching member to permit free displacement thereof from side to side by contact with the inclined faces of the ratchet teeth upon movement of the arcuate member in the opposite direction, thereby causing the teeth to ratchet freely past said pendulum member so that the arcuate member moves freely in the opposite direction relatively to the said pendulum member under the action of the gravity arm.

9. An eye assembly as set forth in claim 8, wherein the arcuate member is so secured to the gravity arm that the arcuate member can oscillate transversely relatively to the gravity arm to a limited extent.

10. An eye assembly including operating means therefor, for dolls, toy animals, and other model figures; said assembly comprising eye elements, a support on which the eye elements are rotatably mounted, a gravity arm, means operatively connecting said gravity arm with said eye elements for rotating the latter upon movement of the entire assembly as a whole, an arcuate member secured at one end to the gravity arm to move therewith and having two sets of ratchet teeth, the teeth of one set being offset with respect to the teeth of the other set, and a latching member, means oscillatably mounting said latching member on said support, and means for loosely mounting said latching member for movement alternately into the paths of the abrupt faces of the ratchet teeth of said respective sets, gravity controlled means associated with said latching member and adapted to so move the latter only upon side to side rocking movement of the said assembly thereby to permit the arcuate member to move step-by-step in one direction relatively to the said latching member under the action of gravity, said loose mounting of the latching member enabling free displacement of the latching member from side to side by contact with the inclined faces of the ratchet teeth upon movement of the arcuate member in the opposite direction thereby permitting the teeth to ratchet freely past the latching member so that the arcuate member moves freely in the opposite direction relatively to the said latching member under the action of the gravity arm.

11. An eye assembly including operating means therefor, for dolls, toy animals, and other model figures; said assembly comprising eye elements, a mount supporting said eye elements, a gravity arm, means operatively connecting said gravity arm with said eye elements for rotating the latter upon movement of the entire assembly as a whole, an escapement device secured to the gravity arm to move therewith, a support, and a latching element oscillatably mounted on said support, said escapement device having means cooperating with said latching element to prevent said eye assembly from moving from the open position of the eye elements to the closed position thereof except upon giving the eye unit side to side rocking movements, the eye assembly being thereupon free to move in the reverse direction under the action of the gravity arm.

GEORGE RICHARD RATCLIFF.

References Cited in the file of this patent

UNITED STATES PATENTS

| Number | Name | Date |
|---|---|---|
| 1,244,799 | Trost | Oct. 30, 1917 |
| 1,343,422 | Thomson et al. | June 15, 1920 |
| 1,859,321 | Wilhelm | May 24, 1932 |
| 2,197,764 | Marcus | Apr. 23, 1940 |